(12) United States Patent
Ohlhausen et al.

(10) Patent No.: US 6,994,890 B2
(45) Date of Patent: Feb. 7, 2006

(54) CLEANING AND MULTIFUNCTIONAL COATING COMPOSITION CONTAINING AN ORGANOSILANE QUATERNARY COMPOUND AND HYDROGEN PEROXIDE

(75) Inventors: Howard G. Ohlhausen, Paradise Valley, AZ (US); Jerome H. Ludwig, Sun City West, AZ (US)

(73) Assignee: Resource Development L.L.C., Scottsdale, AZ (US)

( * ) Notice: Subject to any disclaimer, the term of this patent is extended or adjusted under 35 U.S.C. 154(b) by 239 days.

(21) Appl. No.: 10/698,313

(22) Filed: Oct. 31, 2003

(65) Prior Publication Data

US 2005/0096250 A1 May 5, 2005

(51) Int. Cl.
C09D 183/08 (2006.01)
C07F 7/08 (2006.01)

(52) U.S. Cl. .................. 427/393.4; 427/387; 427/384; 510/466; 510/199; 510/238; 510/240; 510/264; 510/367; 510/372; 510/375; 510/384; 510/504; 556/413; 106/2; 106/287.11; 106/287.16

(58) Field of Classification Search ............... 510/466, 510/199, 238, 240, 264, 367, 372, 375, 384, 510/504; 427/384, 387, 393.4; 556/413; 106/2, 287.11, 287.16
See application file for complete search history.

(56) References Cited

U.S. PATENT DOCUMENTS

| | | | |
|---|---|---|---|
| 2,612,458 A | 9/1952 | Stedman ...................... 117/92 |
| 2,923,653 A | 2/1960 | Matlin et al. ................ 154/101 |
| 2,962,390 A | 11/1960 | Fain et al. ..................... 117/64 |
| 3,130,164 A | 4/1964 | Best ............................ 252/99 |
| 3,244,541 A | 4/1966 | Fain et al. ..................... 106/13 |
| 3,560,385 A | 2/1971 | Roth ......................... 252/49.6 |
| 3,579,540 A | 5/1971 | Ohihausen ................. 260/33.4 |
| 3,730,701 A | 5/1973 | Isquith et al. .................. 71/67 |
| 3,794,736 A | 2/1974 | Abbott et al. ................. 424/78 |
| 3,817,739 A | 6/1974 | Abbott et al. .................. 71/67 |
| 3,860,709 A | 1/1975 | Abbott et al. ............... 424/184 |
| 3,865,728 A | 2/1975 | Abbott et al. ............... 210/169 |
| 4,005,025 A | 1/1977 | Kinstedt .................... 252/89 R |
| 4,005,028 A | 1/1977 | Heckert et al. ............... 252/99 |
| 4,005,030 A | 1/1977 | Heckert et al. ............. 252/140 |
| 4,161,518 A | 7/1979 | Wen et al. .................... 424/52 |
| 4,259,103 A | 3/1981 | Malek et al. ................... 71/67 |
| 4,282,366 A * | 8/1981 | Eudy .......................... 556/413 |
| 4,311,598 A | 1/1982 | Verachtert .................. 210/757 |
| 4,361,273 A | 11/1982 | Levine et al. ................. 236/11 |
| 4,390,712 A | 6/1983 | Karl et al. ................... 556/413 |
| 4,394,378 A | 7/1983 | Klein ......................... 424/184 |
| 4,397,757 A | 8/1983 | Bright et al. .......... 252/186.41 |
| 4,406,892 A | 9/1983 | Eudy ........................... 424/184 |
| 4,421,796 A | 12/1983 | Burril et al. ................. 427/387 |
| 4,430,236 A | 2/1984 | Franks ........................ 252/95 |
| 4,467,013 A | 8/1984 | Baldwin ..................... 428/289 |
| 4,567,039 A | 1/1986 | Stadnick et al. .............. 132/70 |
| 4,576,728 A * | 3/1986 | Stoddart .................... 510/373 |
| 4,615,882 A | 10/1986 | Stockel ........................ 424/80 |
| 4,631,273 A | 12/1986 | Blehm et al. ................. 514/29 |
| 4,682,992 A | 7/1987 | Fuchs .......................... 55/279 |
| 4,781,974 A | 11/1988 | Bouchette et al. .......... 428/288 |
| 4,797,420 A | 1/1989 | Bryant ....................... 514/643 |
| 4,835,019 A * | 5/1989 | White et al. ................ 427/387 |
| 4,842,766 A | 6/1989 | Blehm et al. ............... 252/309 |
| 4,847,088 A | 7/1989 | Blank ......................... 424/404 |
| 4,866,192 A | 9/1989 | Plueddemann et al. ..... 556/410 |
| 4,941,989 A | 7/1990 | Kramer et al. ............. 252/102 |
| 4,990,377 A | 2/1991 | Wilson ....................... 427/387 |
| 4,999,249 A * | 3/1991 | Deschler et al. ............ 428/447 |
| 5,013,459 A | 5/1991 | Gettings et al. ............ 210/764 |
| 5,209,775 A * | 5/1993 | Bank et al. ..................... 106/2 |
| 5,320,805 A | 6/1994 | Kramer et al. ................ 422/28 |
| 5,348,556 A | 9/1994 | Minns et al. .................. 8/137 |
| 5,360,568 A | 11/1994 | Madison et al. ............ 252/102 |
| 5,360,569 A | 11/1994 | Madison et al. ............ 252/102 |
| 5,411,585 A * | 5/1995 | Avery et al. ............. 106/287.1 |
| 5,478,357 A | 12/1995 | Madison et al. ................ 8/111 |
| 5,552,476 A | 9/1996 | Halling ....................... 524/837 |
| 5,620,527 A | 4/1997 | Kramer et al. .................. 134/2 |
| 5,798,144 A * | 8/1998 | Varanasi et al. ............ 427/384 |
| 5,954,869 A | 9/1999 | Elfersy et al. ......... 106/287.16 |
| 5,959,014 A | 9/1999 | Liebeskind et al. ......... 524/389 |
| 6,087,319 A * | 7/2000 | Norman ...................... 510/466 |
| 6,113,815 A | 9/2000 | Elfersy et al. .............. 252/588 |
| 6,120,587 A | 9/2000 | Elfersy et al. ............ 106/18.35 |
| 6,218,351 B1 | 4/2001 | Busch et al. ................ 510/311 |
| 6,221,944 B1 | 4/2001 | Liebeskind et al. ......... 524/386 |
| 6,240,929 B1 | 6/2001 | Richard et al. ............. 132/202 |
| 6,309,425 B1 | 10/2001 | Murphy ........................ 81/42 |
| 6,316,399 B1 | 11/2001 | Melikyan et al. ........... 510/372 |
| 6,346,279 B1 | 2/2002 | Rochon ...................... 424/616 |
| 6,361,787 B1 | 3/2002 | Shaheen et al. ............ 424/406 |

(Continued)

FOREIGN PATENT DOCUMENTS

CA 1010782 5/1977

(Continued)

Primary Examiner—Charles Boyer
(74) Attorney, Agent, or Firm—Wood, Herron & Evans, L.L.P.

(57) ABSTRACT

Cleaning and multifunctional coating compositions containing hydrogen peroxide and an organosilane quaternary compound in aqueous formulations are used to improve water and soil repellency and residual antimicrobial activity. Various surfaces may be treated including metal, glass, plastics, rubber, porcelain, ceramic, marble, granite, cement, tile, sand, silica, enameled appliances, polyurethane, polyester, polyacrylic, melamine/phenolic resins, polycarbonate, siliceous, painted surfaces, wood, and the like.

25 Claims, No Drawings

U.S. PATENT DOCUMENTS

| | | | |
|---|---|---|---|
| 6,372,702 B1 | 4/2002 | Chiou et al. | 510/222 |
| 6,391,840 B1 | 5/2002 | Thompson et al. | 510/376 |
| 6,403,547 B1 | 6/2002 | Grippaudo et al. | 510/280 |
| 6,417,151 B1 | 7/2002 | Grothus et al. | 510/312 |
| 6,432,181 B1 | 8/2002 | Ludwig | 106/2 |
| 6,436,445 B1 | 8/2002 | Hei et al. | 424/667 |
| 6,461,537 B1 | 10/2002 | Turcotte et al. | 252/194 |
| 6,530,384 B1 | 3/2003 | Meyers et al. | 134/25.2 |
| 6,534,075 B1 | 3/2003 | Hei et al. | 424/405 |
| 6,548,467 B2 | 4/2003 | Baker et al. | 510/312 |
| 6,610,777 B1 | 8/2003 | Anderson et al. | 524/588 |
| 6,613,755 B2 | 9/2003 | Peterson et al. | 514/63 |

FOREIGN PATENT DOCUMENTS

| | | | |
|---|---|---|---|
| CA | 1217004 | | 1/1987 |
| EP | 129980 | * | 1/1985 |

* cited by examiner

CLEANING AND MULTIFUNCTIONAL COATING COMPOSITION CONTAINING AN ORGANOSILANE QUATERNARY COMPOUND AND HYDROGEN PEROXIDE

FIELD OF THE INVENTION

This invention relates to a cleaning composition which also provides a multifunctional coating on the clean surface to render it water and soil repellent, as well as antimicrobial. Organosilane quaternary nitrogen compounds are formulated with hydrogen peroxide in aqueous media to provide the cleaning and multifunctional coating composition.

BACKGROUND OF THE INVENTION

Rain and coastal spray from lakes and oceans contain enough dissolved gases, carbonic acid, chlorides, sulfates, nitrates, ammonia and particulate matter to make them chemically active. Similarly, most ground and municipally supplied water, while generally safe for drinking, cooking, washing and bathing, still contains enough salts, hard water minerals, bacteria, organic and inorganic contaminates and water treatment chemicals to also be chemically active.

When either source of water is allowed to evaporate on most siliceous and nonsiliceous surfaces such as glass, porcelain, ceramic, marble, granite, polyurethane, polyester, polyacrylic, melamine/phenolic resins and polycarbonate, it combines with ordinary soil to promote the formation, adhesion and build-up of insoluble mineral deposits, lime scale, rust and soap scum. This ongoing exposure to chemically active water contributes directly to increased soiling and to the costly surface damaging cycle that results from scraping and scrubbing with harsh cleaners and cleansers to remove the insoluble buildup.

Thus, until rain, ground and municipally furnished water is completely deionized and demineralized, any kitchen and bath surface exposed to water and water-containing spills and splatters (such as sinks, counters, ranges, ovens, cooking and washing appliances, bathtubs and shower enclosures) remains subject to the adhesion and buildup of water insoluble soil.

To remove water insoluble soil, homemakers and cleaning professionals have turned to stronger and stronger cleaning aids including powerful acids and alkalis, penetrating solvents and a broad range of abrasive cleaners. The inevitable result of using such harsh cleaning aids is a surface destroying cycle. The stronger the cleaning action, the more it opens the microscopic pores and increases the hydrophilicity of the surface. The more open and vulnerable the pores, the deeper the new soil penetrates and the greater its adhesion and build-up, and the stronger the cleaning action required to remove the soil with greater and greater destruction of the surface finish. Although microscopic at first, this cycle ultimately leads to surfaces that are visibly rough, exhibit the loss of color and sheen, and become more prone to soiling.

It has been established that the soil and water repellency of surfaces can be improved by the use of silicone compositions. There has been extensive research and development involving silicone compositions for rendering surfaces water repellent. For example, U.S. Pat. No. 2,612,458 (Stedman) discloses the application of substituted polysilicanes to windshields to achieve repellency. U.S. Pat. No. 2,923,653 (Matlin et al.) discloses improved compositions employing alkoxy groups in the polysilicane to improve the repellency. U.S. Pat. No. 2,962,390 (Fain et al.) describes a paste containing a solid rubbing agent and an alkyl alkoxy silane which when rubbed on a glass surface provides repellency. U.S. Pat. No. 3,244,541 (Fain et al.) discloses acidic solutions of alkyl alkoxy silane monomers that produce rain repellent films on glass and which are also solvent resistant.

U.S. Pat. No. 3,579,540 (Ohlhausen) discloses water repellent film-forming compositions of alkylpolysiloxanes and acid, or alkylpolysiloxanes, acid and solvent which result in durable and effective water repellent films on various surfaces. Further improvements in solventless compositions for treating porous and nonporous surfaces have been made as disclosed in U.S. Pat. No. 6,432,181 (Ludwig and Ohlhausen). The '181 patent satisfied a need which existed for soil and water repellent compositions that eliminate solvents and utilize the silicone more effectively and economically. Additional improvements in soil and water repellent compositions were made by providing physiologically acceptable compositions that were nonirritating to the skin of the user as disclosed in U.S. pat. application Ser. No. 09/941,896, filed Aug. 28, 2001 (Ludwig and Ohlhausen), now U.S. Pat. No. 6,676,733.

Many different types of hard and soft surfaces have also been rendered antimicrobial by coating with different agents. Organosilane quaternary nitrogen compounds have also been employed effectively in eliminating and/or reducing microbial contamination when applied to a variety of surfaces. For instance, bacterial, viral and fungal contamination may be eliminated or reduced when such organosilane quaternary compounds are applied to surfaces. Commercially available quaternary ammonium organosilanes which have been used for this purpose include 3-(trimethoxysilyl)propyldimethyloctadecyl ammonium chloride, 3-(trimethoxysilyl)propyldidecylmethyl ammonium chloride, and 3-(trimethoxysilyl)propyltetradecyldimethyl ammonium chloride.

Notwithstanding the improvements that have been made over many decades of research and development regarding cleaning or coating compositions for various surfaces, there still exists the need for further improvements.

SUMMARY OF THE INVENTION

This invention relates to a composition for cleaning a surface and providing it with a bonded multifunctional coating. The cleaning and coating composition comprises a cationic organosilane quaternary ammonium compound (sometimes hereinafter simply "organosilane quat") and hydrogen peroxide which is bondable onto said surface. The components are used in effective amounts in aqueous media for cleaning a surface and for bonding a multifunctional coating onto said surface thereby rendering it (a) water and soil repellent and (b) antimicrobial.

It has been found that the inventive coating composition has surfactant properties which enable a soiled surface to be cleaned and simultaneously rendered water and soil repellent, as well as antimicrobial. Accordingly, everyday surfaces that are soiled with everyday household soil that result from cooking, eating, washing, etc. may be simultaneously cleaned and provided with a bonded coating that rather permanently repels water and soil while having antimicrobial properties.

It has also been discovered that the organosilane quat in combination with the hydrogen peroxide provides synergistic results upon bonding onto surfaces. The inventive composition containing the combination of the organosilane quat and hydrogen peroxide components provides unexpectedly improved bonding and durability of the composition on various surfaces. In other words, the results achieved with the combined components in the composition exceeds the expected algebraic sum of the activity of each component when separately used on the surface. These synergistic activities contribute to the unique compositions and methods of this invention.

In general, the organosilane quat is used in the composition in an amount up to about 3% by weight and the hydrogen peroxide is used in an amount up to about 8% by weight of the composition. More preferably, the organosilane quat is used in an amount of up to about 1% by weight and hydrogen peroxide is used in an amount of about 3 to about 6% by weight.

The coating composition may further contain a solvent such as an alcohol, polyol, glycolether and mixtures thereof, for example, glycol, propylene glycol monomethyl ether, methanol, ethanol or isopropanol. Further, preferably the aqueous media is acidic, wherein the pH is on the order of about 2 to about 5. The composition is also preferably formulated with deionized water.

The invention also involves a method for treating everyday surfaces as found in homes, offices, vehicles, etc. with a composition that provides a clean surface and a multifunctional coating. For example, everyday surfaces that are soiled with spills, splatters and blemishes that results from cooking, eating, washing, etc. may be cleaned and provided with the multifunctional coating upon application of the inventive composition. For example, a liquid inventive composition can be applied by wiping or spraying onto a soiled surface in an effective amount and the soil is removed by wiping. Upon such application, the surface becomes clean and a multifunctional coating is bonded onto the surface thereby forming a clean, soil and water repellent and antimicrobial surface.

A further understanding of the invention, its various embodiments and operating parameters will be apparent with reference to the following detailed description.

DETAILED DESCRIPTION OF THE INVENTION

In accordance with the above summary, the objectives of this invention are to provide compositions and methods for simultaneously cleaning, disinfecting and rendering everyday surfaces water and soil repellent in essentially one step. The invention provides compositions that are (1) VOC compliant and biodegradable, (2) high-performance, penetrating cleaners, (3) broadband disinfectants, (4) bondable, durable water and soil repellents that are resistant to removal by soaps, solvents, detergents and mild abrasives, (5) effective on an extraordinary range of everyday household and vehicular surfaces, (6) storage stable and economical in terms of performance and coverage, and (7) that can be used or applied with ordinary spray-and-wipe techniques.

In accordance with the best mode of this invention, the multifunctional coating composition includes a cationic organosilane quaternary ammonium compound which is bondable onto said surface as defined by the formula:

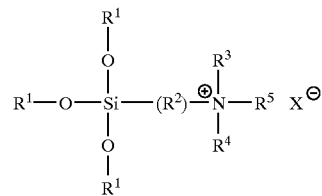

wherein $R^1$=hydrogen and/or $C_1$ to $C_4$ alkyl; $R^2$=divalent hydrocarbon radical with $C_1$ to $C_8$ carbon atoms, $R^3$=hydrogen or $C_1$ to $C_4$ alkyl, $R^4$=hydrogen or $C_1$ to $C_{10}$ alkyl, $R^5$=$C_{10}$ to $C_{22}$ saturated or unsaturated hydrocarbon radical and X=halide (preferably chloride or bromide), carboxylate (acetate, glycolate), sulfonate, hydroxide, sulfate, or phosphate.

The organosilane quat is contained in an amount of up to about 1 to 3%, preferably about 0.4–0.7% and the hydrogen peroxide is in an amount up to about 8%, preferably about 3 to 6%, in an acidic deionized aqueous media. The pH of the acidic media is about 2 to about 5, preferably about 3. The composition may further contain a solvent selected from the group of an alcohol, polyol, glycolether and mixtures thereof, as mentioned above, more preferably, methanol, ethanol or isopropanol.

The cationic organosilane quaternary ammonium compound is selected from the group consisting of 3-(trimethoxysilyl)propyldimethyloctadecyl ammonium chloride, 3-(trimethoxysilyl)propyldidecylmethyl ammonium chloride, 3-(trimethoxysilyl)propyltetradecyldimethyl ammonium chloride, 3-(trimethoxylsilyl)propyldimethylsoya ammonium chloride, 3-(trimethoxysilyl)propyldimethyloleyl ammonium chloride, 3-(trimethoxysilyl)propyloctadecyl ammonium chloride, 3-(trimethoxysilyl)propyloleyl ammonium chloride, and 3-(trihydroxysilyl)propyldimethyloctadecyl ammonium chloride. Other suitable organosilane quats may be used, providing they function to clean and bond a multifunctional coating onto a surface.

It has been found that the preferred compositions of this invention contain organosilane quaternary ammonium compounds that have surfactant activities which facilitate the cleaning of the surface and also provide reactive groups for bonding with the surface to obtain the desired cleaning and multifunctional coating capabilities. Accordingly, it is preferred for the organosilane to have a hydrocarbon group such as a $C_{10}$–$C_{22}$ saturated or unsaturated hydrocarbon group which facilitates the surfactant, water repellent and antimicrobial activities.

Suitable quaternary organosilanes are described in further detail with reference to the following Examples. As stated above, the relative amounts of the quaternary silanes and hydrogen peroxide to achieve the objectives of this invention, in general, are up to about 3% and 8% by weight, respectively. More specific amounts for the most preferred organosilane quats, like 3(trimethoxysilyl)propyldimethyloctadecyl ammonium chloride, are about 0.4 to about 0.7% by weight and about 3% by weight of hydrogen peroxide.

Quaternary ammonium compounds are known to bond to anionic surfaces by interaction with absorbed water on the surface. This can be described by the following equation.

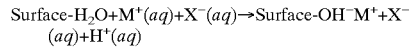

wherein $M^+$ is an organic cation other than hydrogen ion and a hydrogen ion is displaced from the adsorbed surface water to become hydrated and to enter the aqueous phase as H⁺(aq). Thus the organic cation (M⁺) is "hydrogen bonded" to the anionic surface.

While not desiring to be bound by theory, it is believed helpful for a further understanding of the invention to postulate a mechanism by which the cationic organosilane quaternary compound is bonded to the surface in the presence of hydrogen peroxide. Hydrogen peroxide is well known for its antimicrobial activity and its oxidizing power which has been used to destroy a variety of toxic pollutants. In aqueous solution it is a stronger acid than water with reference to the following equation:

$$HOOH \rightarrow H^+ + HOO^-$$

However, it has not been known before this invention to combine hydrogen peroxide with an organosilane quat to obtain the cleaning and coating benefits described herein, especially the synergistic activities.

In order to understand the synergistic activities that have been demonstrated in the following Examples of this invention, it is believed that hydrogen peroxide, which is very similar to water, will be adsorbed onto anionic surfaces in a similar manner as demonstrated by the following equation:

$$\text{Surface-HOOH} + M^+(aq) + X^-(aq) \rightarrow \text{Surface-OOH}^- M^+ + X^- + H^+(aq)$$

wherein M⁺ is an organic cation other than H⁺, and H⁺ is displaced from adsorbed surface hydrogen peroxide to become hydrated and to enter the aqueous phase as H⁺(aq). It is believed that the organic cation (M⁺) is thus hydrogen bonded to the anionic surface associated with the hydroperoxide ion (—OOH⁻) even stronger than when associated with the hydroxide ion (—OH⁻) when water is on the anionic surface.

If the organic cation also contains a silane function (—Si—OR) which can hydrolyze to a silanol (—Si—O—H), additional bonding of a chemical nature can occur with the substrate silanols on the substrate surfaces or to another organic cation silanol which would lead to polymerization and crosslinking of the organo quaternary compounds on the substrate surface. This chemical bonding leads to a durable coating which is not easily removed from the substrate surface.

With the additional cleaning capability of hydrogen peroxide on anionic surfaces and its ability to strengthen the hydrogen bonding of the silane quaternary cation (M⁺) to the anionic surface, thus facilitating the enhanced chemical bonding of the silane to the surface and subsequent crosslinking, an improved surface bonding or durability of the coating results from application of the compositions of this invention. It has been found that the combination of the cationic organosilane quaternary compound with hydrogen peroxide provides synergistic results. In other words, the resultant bonding and durability of this combination of components unexpectedly exceeds the summation of the individual components' activities, as demonstrated by the Examples which follow.

The invention may be more readily understood by the following detailed disclosure of preferred embodiments of the invention. It is to be understood that the terminology used herein is for the purpose of describing particular embodiments and is not intended to be limiting.

The term "abrasion resistant" as used herein refers to a surface, surface coating or finish that is resistant to damage or removal by washing, scraping or scrubbing with a mildly abrasive substance or process without visibly damaging to the surface or finish, as in scratching or blemishing the surface.

The term "antimicrobial" is used herein to describe the elimination, reduction and/or inhibition of microorganism growth such as mold, virus, fungus or bacteria.

The term "application", "applying" or "applied" as used herein means the treatment of a surface generally and (a) in the case of a liquid, by spraying and wiping, or agitating and wiping, or by wiping and polishing, (b) in the case of a cream, by wiping and/or polishing and (c) in the case of a gel, by wiping and/or polishing. The application of the inventive composition is usually by spraying and wiping, wiping and polishing or wiping, agitating and polishing, although these forms of treatment are by exemplification and not restrictive.

As used herein, the term "bond", "bonded" or "bondable" means the ability to strongly adhere the composition to the surface, as in the ability to bond a water & soil repellent finish, coating or characteristic to an otherwise water and soil accepting surface. As used herein, the composition is deemed "bonded" or "bondable" when it is resistant to removal by soaps, solvents, detergents or abrasive-type cleansers that would not otherwise stain, blemish or damage an untreated form of the same surface.

As used herein, "multifunctional" means the process of achieving two or more discernable results from a single application, as in simultaneously or sequentially cleaning and coating a surface whereby the coating also performs the function(s) of rendering the surface water repellent, soil repellent and/or antimicrobial.

The term "durable" or "durability" means long-lasting and not easily removed by washing and/or wiping using plain (tap) water, soap solutions, detergent solutions, household solvents, mildly abrasive (non-damaging) cleansers or conventional cleaner/degreasers.

By the term "everyday household soil" is meant the spills, splatters and blemishes on a surface that result from cooking, eating, drinking, washing, bathing and showering such as milk, coffee, tea, juices, sauces, gravies, food boil over, soap scum, water spots, mineral deposits, etc.

By the term "everyday vehicular soil" is meant the spills, splatters and blemishes on the exterior of a vehicular surface that result from rain, sleet, snow, insects, mud and road grime, and on the interior of a vehicular surface that result from fingerprints, food spillage, plasticizer leaching, smoking, use of hair and deodorizing sprays and air circulation.

By the term "surface(s)" is meant the full range of hard or soft surfaces, rather porous or non-porous, siliceous or non-siliceous, as exemplified by everyday surfaces and such as those used in the following examples which illustrate the compositions and methods of this invention. Examples of such surfaces include, without limitation metal, glass, plastics, rubber, porcelain, ceramic, marble, granite, cement, tile, sand, silica, enameled appliances, polyurethane, polyester, polyacrylic, melamine/phenolic resins, polycarbonate, siliceous, painted surfaces, wood, and the like.

By the term "everyday surfaces" as used herein is meant the full range of surfaces in homes, offices, factories, public building and facilities, vehicles, aircraft and ships, and the like.

By the term "resistant to removal" is meant a coating or surface finish that is not easily removed by washing or cleaning with conventional soaps, solvents, detergents, mildly abrasive cleansers or cleaner/degreasers that would not otherwise etch or damage an untreated surface of the same composition and construction.

As used herein, the term "soil repellent" means a surface that exhibits reduced adhesion to, and buildup of, for example, everyday household and vehicular soil both before and after evaporation of the water component.

The terms "water repellent" and "water repellency" as used herein describe the hydrophobic nature or characteristic of a surface and its ability to repel water as measured by the contact angle of a drop or droplet of distilled water on the surface. (Contact angles measured with rainwater, municipally furnished tap water or ground water are typically more variable and non-reproducible, and commonly measure up to 10° less than those using distilled or deionized water.) Generally, the hydrophobicity of a discrete surface is rated in terms of its contact angle to water drops as follows:

Excellent Compact drops, well rounded, with bright sparkles measuring 95° or more Good Less rounded drops, but bright sparkles that exhibit slight spread, measuring 85° to 95°

Fair Visible flattening of the water drops, measuring 70° to 85°

Poor Relatively flat water drops, exhibiting more spread of the water and measuring 50° to 70°.

EXAMPLES 1–22

Comparative Bonding Tests on Surfaces

These tests utilize the degree and durability of the water repellency of the treated surface as a practical measure of bonding after application of the composition to the surface followed by scrubbing of the surface with an abrasive cleaner that is capable of removing the repellent coating from the surface without scratching. The degree of repellency was determined by the contact angle and appearance of water drops when applied to the scrubbed area on the surface. Coatings resulting from the application of (1) the inventive compositions of the organosilane quat and hydrogen peroxide were compared to coatings of (2) the organosilane quat, alone and (3) hydrogen peroxide, alone. Comparative coatings of other organic cationic species, with and without hydrogen peroxide, were also tested.

A. Preparation of the Surface

New 12"×12" glass mirrors were cleaned and made hydrophilic by scrubbing the surface with the soft cleanser MIRACLE SCRUB, a non-scratching, mildly abrasive hard surface cleanser available from Unelko Corporation, Scottsdale, Ariz., and using a moist cellulose sponge. After cleaning, the mirror surface was rinsed with hot water to remove the MIRACLE SCRUB residue followed by a rinse with deionized water followed by drying with a paper towel. The cleaned mirrors were then allowed to air dry for at least 24 hours. A surface is judged clean and free of surface soil when water spreads out and wets the surface.

B. Preparation of Test Compositions

The test solutions for the Comparative Bonding Tests were all prepared according to the following formulations with and without hydrogen peroxide.

| A. Without Hydrogen Peroxide | B, With Hydrogen Peroxide |
|---|---|
| 6% (wt.) Isopropyl alcohol | 6% (wt.) Isopropyl alcohol |
| 0.4% (wt.) Organic Cationic | 0.4% (wt.) Organic Cationic |
| q.s. Deionized Water | 3.0% (wt.) Hydrogen Peroxide |
| | q.s. Deionized Water |

In all compositions the pH was adjusted to 3 with 1.0 N hydrochloric acid.

C. Comparative Bonding Test Procedure

Two compositions formulated with the same organic cationic species, but one with and one without hydrogen peroxide were applied to the same 12"×12" mirror. One half of the mirror was masked with paper and the other half was sprayed with the peroxide-free composition followed by spreading with a paper towel and wiping the surface until dry. The covering was reversed, and the other half of the mirror was then treated in the same manner with the composition containing hydrogen peroxide.

The mirror was then rinsed with tap water followed by deionized water to remove any excess of the compositions from the surface. The rinsed mirror was then dried with a paper towel.

A small but equal amount of MIRACLE SCRUB was applied to a section of each half of the now-treated mirror surface. A moist cellulose sponge was used to scrub the surface of each test half using a circular motion and a moderate pressure on the sponge. Ten circular motions were used on each area. The MIRACLE SCRUB residue was then rinsed with tap water followed by a deionized water rinse. The mirror surfaces were then dried with a paper towel. The dried, scrubbed areas were then compared and evaluated for water repellency to determine the relative durability (degree of bonding) of the two surface coatings.

With the mirror in a horizontal position, several equal sized drops of deionized water were placed on the scrubbed areas of each section of the mirror surface and evaluated for repellency. The contact angle of the drops as well as the spread of the drops were assessed and rated in accordance with the standard for water repellency described in the definition of terms: Excellent—Good—Fair—Poor.

D. Test Results

Table 1 represents the comparative bonding test results on six organosilane quaternary compounds formulated according to the above formulas A and B. In all tests, improved bonding or durability of the coating was observed in formulations containing hydrogen peroxide. Examples 1, 2, 3 and 6 are tetra-alkyl quaternary compounds. Examples 4 and 5 are dialkyl quaternary compounds. Examples 1, 2, 3, 4 and 5 are trialkoxysilanes. Example 6 is a trihydroxysilane.

TABLE 1

Organosilane Quaternary Compounds
Comparative Bonding Test Results

| Example | Organosilane Quaternary Compound | Without $H_2O_2$ | With $H_2O_2$ |
|---|---|---|---|
| 1 | 3(TMS)P*-dimethyloctadecyl-ammonium chloride | Good | Excellent |
| 2 | 3(TMS)P*-dimethylsoya-ammonium chloride | Fair | Good-Excellent |
| 3 | 3(TMS)P*-dimethyloleyl-ammonium chloride | Good | Good-Excellent |
| 4 | 3(TMS)P*-octadecyl-ammonium chloride | Good | Excellent |
| 5 | 3(TMS)P*-oleyl-ammonium chloride | Fair | Good |

TABLE 1-continued

Organosilane Quaternary Compounds
Comparative Bonding Test Results

| Example | Organosilane Quaternary Compound | Without $H_2O_2$ | With $H_2O_2$ |
|---|---|---|---|
| 6 | 3-(trihydroxysilyl) propyldimethyloctadecyl ammonium chloride | Poor-Fair | Fair-Good |

*3(TMS)P = 3(trimethoxysilyl)propyl

Table 2 represents the Comparative Bonding Test Results on two trialkyl quaternary compounds (Examples 7 and 8) and one tetraalkyl quaternary (Example 9) along with three trihydroxy silanes (Examples 11, 12 and 13). Examples 12 and 13 were employed at a 1% active level in ethanol solution. All Examples with or without hydrogen peroxide were judged as "Poor" on the Comparative Bonding Test. This indicates that all of the silane and quaternary derived coatings were easily removed with a mild abrasive cleaner. This also indicates that there were no chemical bonds between the "coating" and the substrate. Perhaps only hydrogen bonding, which is a much weaker bond than a chemical bond, was holding the "coating" to the substrate.

It was also noted that prior to scrubbing of the treated surface with MIRACLE SCRUB, all treated surfaces were rated by the water drop test as follows:

Example 7: Excellent—both with and without peroxide
Example 8: Good without peroxide Fair with peroxide
Example 9: Good—both with and without peroxide
Example 10: Fair—both with and without peroxide
Example 11: Poor-Far—both with and without peroxide
Example 12: Good—both with and without peroxide
Example 13: Good—both with and without peroxide

TABLE 2

Silane or Quaternary Compounds
Comparative Bonding Test Results

| Example | Silane or Quaternary Compound | Without $H_2O_2$ | With $H_2O_2$ |
|---|---|---|---|
| 7 | Octadecyldimethyl ammonium chloride | Poor | Poor |
| 8 | Di($C_8$–$C_{10}$) alkyldimethyl ammonium chloride | Poor | Poor |
| 9 | Alkyl ($C_{14}$, $C_{16}$, $C_{12}$) dimethyl-benzyl-ammonium chloride | Poor | Poor |
| 10 | Decyldimethyl ammonium chloride | Poor | Poor |
| 11 | Chloropropyltrihydroxy silane | Poor | Poor |
| 12 | Trifluoropropyltrihydroxy silane | Poor | Poor |
| 13 | Tridecafluorooctyltrihydroxy silane | Poor | Poor |

To further evaluate the invention, additional kitchen and bath surfaces were treated with one of the preferred organosilane quaternaries of Example 1, i.e., 3-(trimethoxysilyl) propyldimethyloctadecyl ammonium chloride was used in all Examples 14–22-Table 3, employing the test formulations without and with hydrogen peroxide, as defined earlier, and with 3% hydrogen peroxide alone. Table 3, Kitchen and Bath Surfaces, Comparative Bonding Test Results, reports the evaluation on 8 additional everyday surfaces found in the kitchen and bath areas. The hard, glass-like surfaces of Examples 14, 15, 16 and 22 were cleaned and treated with the organosilane quaternary compositions (with and without hydrogen peroxide) according to the A. PREPARATION OF THE GLASS TEST SURFACE previously described. The more porous surfaces of Examples 17–21 were cleaned with MIRACLE SCRUB in the same manner, however, there were 3 treatments of the surfaces with the compositions, employing a tap water rinse followed by deionized water rinse between each application and after the last application. The Comparative Bonding Test was then run on all the surfaces. The results are summarized in Table 3.

TABLE 3

Kitchen and Bath Surfaces
Comparative Bonding Test Results

| | | Organosilane Quat Test Results | | |
|---|---|---|---|---|
| Example | Surface | Without $H_2O_2$ | With $H_2O_2$ | $H_2O_2$ Alone |
| 14 | Baked Enamel | Poor | Good | Poor |
| 15 | Smooth Ceramic Tile | Fair | Good | Poor |
| 16 | Textured Ceramic Tile | Fair | Good | Poor |
| 17 | Chemically Frosted Glass | Good | Excellent | Poor |
| 18 | Formica Counter Top | Poor | Good | Poor |
| 19 | Corian (by DuPont) | Fair | Good | Poor |
| 20 | Marble Tile | Fair–Good | Good–Excellent | Poor |
| 21 | Granite Tile | Poor | Good | Poor |
| 22 | Glass | Good | Excellent | Poor |

These results again demonstrate the invention on other kitchen and bath surfaces. In all examples the performance of the inventive organosilane quat composition with hydrogen peroxide demonstrated improved bonding or durability of the coating compared to the composition without hydrogen peroxide or to hydrogen peroxide treatment alone. With reference to Table 3, a synergism was observed between 3-(trimethoxysilyl)propyldimethyloctadecyl ammonium chloride and hydrogen peroxide on all surfaces. In all Examples 14–22, $H_2O_2$, alone resulted in "Poor" bonding or durability. In Examples 14–16, 18–19 and 21, the organosilane quat, alone, also resulted in "Poor" or "Fair" bonding or durability. However, synergistically, the combination of the organosilane quat and hydrogen peroxide gave "Good" to "Excellent" results. Even in the case of Examples 17, 20 and 22, "Excellent" results were achieved for the inventive combination where $H_2O_2$ was not expected to contribute a beneficial result.

It was also noted during the test that prior to scrubbing the treated surface with MIRACLE SCRUB, all Examples gave an Excellent rating on the water drop test except for Example 19 which were rated as Good-Excellent on both surfaces. Also, all surfaces treated with hydrogen peroxide alone gave Poor results prior to scrubbing the treated surface with MIRACLE SCRUB.

EXAMPLES 23–35

Cleaning of Everyday Surfaces

Test: To determine the ability of the composition (Example #1, Table #1, with hydrogen peroxide) to clean everyday spills and splatters off of previously untreated surfaces on which milk, coffee, tea, grape juice, soap scum, toothpaste residue and hard water minerals (as applicable to the surface) had been allowed to dry by evaporation for a period of at least 12 hours at an ambient temperature of ±78° F. The composition was sprayed onto the soiled surfaces, allowed to penetrate the soil until the foam subsided and the surfaces were agitated and wiped dry using a soft paper towel.

Results: After wiping, the surfaces were examined both visually and with 3× magnification, and the paper towels were examined for stains, discoloration and residue typical of the soil that had been cleaned off the surface. The results are reported in Table 4.

TABLE 4

| Example | Everyday Surface | Visual | 3X Magnification | Paper Towel |
|---|---|---|---|---|
| 23 | Granite Counters and Tiles | Clean | No Residual | Soiled |
| 24 | Formica-type Counters | Clean | No Residual | Soiled |
| 25 | Glass Tables | Clean | No Residual | Soiled |
| 26 | Ceramic Counter, Wall and Floor Tiles | Clean | No Residual | Soiled |
| 27 | Polished Marble Tables and Counters | Clean | No Residual | Soiled |
| 28 | Exterior Windows and Patio Doors | Clean | No Residual | Soiled |
| 29 | Interior Windows, Mirrors and Patio Doors | Clean | No Residual | Soiled |
| 30 | Porcelain Sinks and Bathtubs | Clean | No Residual | Soiled |
| 31 | Sink, Bathtub and Shower Plumbing Fixtures | Clean | No Residual | Soiled |
| 32 | Acrylic, Fiberglass and Cultured Marble Sinks, Bathtubs and Shower Surrounds | Clean | No Residual | Soiled |
| 33 | Vehicular Windshields, Windows and Mirrors and Lights (Exterior) | Clean | No Residual | Soiled |
| 34 | Vehicular Windshields, Windows and Mirrors and Lights (Interior) | Clean | No Residual | Soiled |
| 35 | Vehicular Exteriors - Paint Finishes, Plastic and Metal Components | Clean | No Residual | Soiled |

EXAMPLES 36–48

Imparting Water and Soil Repellency to Everyday Surfaces

Test: To determine the ability of the composition (Example #1, Table #1, with hydrogen peroxide) to clean everyday spills and splatters off of previously untreated surfaces and simultaneously impart a functional water and soil repellent finish to reduce the adhesion and buildup of subsequent exposure to everyday spills and splatters. Previously untreated surfaces, on which milk, coffee, tea, grape juice, soap scum, toothpaste residue and hard water minerals (as applicable to the surface) had been allowed to dry by evaporation for a period of at least 12 hours at an ambient temperature of ±78° F., were sprayed with the composition. The composition was allowed to penetrate the soil until the foam subsided and the soiled areas were agitated and wiped dry with a soft paper towel. Additional quantities of milk, coffee, tea, grape juice, soap scum, diluted toothpaste and mineral-laden water were then spilled and spattered on the surface and allowed to evaporate for 12 hours at ambient temperature of 78° F. To assess the practical soil repellency imparted by the composition, approximately one-half of the now treated and resoiled areas were dry-wiped with a soft paper towel to remove the spills and splatters. To assess the practical water and soil repellency imparted by the composition, the other half of the now treated and resoiled areas were sprayed with tap water and wiped dry.

Results: After dry-wiping, the surfaces were examined both visually and with 3× magnification for residual soil. After spraying with tap water and wiping until dry, the surfaces were examined both visually and with 3× magnification for residual soil. All paper towels showed various degress of stain, discoloration and residue typical of the soil that had been cleaned off the surface. The results are reported in Table 5.

TABLE 5

| Example | Everyday Surface | Dry Wipe Visual 3× Magnification | Wet Wipe Visual 3× Magnification |
|---|---|---|---|
| 36 | Granite Counters and Tiles | Clean-No Residual | Clean-No Residual |
| 37 | Formica-type Counters | Clean-Very Slight Residual | Clean-No Residual |
| 38 | Glass Tables | Clean-No Residual | Clean-No Residual |
| 39 | Ceramic Counter, Wall and Floor Tiles | Clean-No Residual | Clean-No Residual |
| 40 | Polished Marbles Tables and Counters | Clean-Very Slight Residual | Clean-No Residual |
| 41 | Exterior Windows and Patio Doors | Clean-No Residual | Clean-No Residual |
| 42 | Interior Windows, Mirrors and Patio Doors | Clean-No Residual | Clean-No Residual |
| 43 | Porcelain Sinks and Bathtubs | Clean-No Residual | Clean-No Residual |

TABLE 5-continued

| Example | Everyday Surface | Dry Wipe Visual 3× Magnification | Wet Wipe Visual 3× Magnification |
|---|---|---|---|
| 44 | Sink, Bathtub and Shower Plumbing Fixtures | Clean-No Residual | Clean-No Residual |
| 45 | Acrylic, Fiberglass and Cultured Marble Sinks, Bathtubs and Shower Surrounds | Clean-Slight Residual | Clean-No Residual |
| 46 | Vehicular Windshields, Windows, Mirrors and Lights (Exterior) | Clean-No Residual | Clean-No Residual |
| 47 | Vehicular Windshields, Windows, Mirrors and Lights (Interior) | Clean-No Residual | Clean-No Residual |
| 48 | Vehicular Exteriors - Paint Finishes, Plastic and Metal Components | Clean-Slight Residual | Clean-No Residual |

EXAMPLES 49–61

Performance and Durability of Water and Soil Repellent Compositions

Test: To determine the performance and durability of the water and soil repellent finish imparted by the composition (Example #1, Table #1, with hydrogen peroxide) when used to clean everyday spills and splatters off of treated surfaces, the surfaces were soiled with milk, coffee, tea, grape juice, soap scum, toothpaste residue and hard water minerals (as applicable to the surface being tested) and these elements were allowed to dry by evaporation for a period of at least 12 hours at an ambient temperature ±78° F. The soiled areas were then sprayed with tap water and wiped with a soft paper towel. This resoiling and cleaning with tap water cycle was repeated 15 times. When measuring the water repellency of everyday, installed surfaces, it is impractical to conduct water drop or droplet tests with distilled water. To replicate real world conditions, spray tests are conducted using ordinary spray bottles filled with municipally furnished tap water typical of the region in which the tests are conducted.

Results: The soiled areas were easily cleaned with minimal wiping effort. Examination of the paper towels revealed residue and discoloration typical of the elements that had been removed. Visual examination of the surfaces after cleaning revealed no soil residue. After cleaning, tap water was sprayed on the treated surfaces and the hydrophobicity of the surfaces was rated high (75° or more), medium (50° to 75°) or low (25° to 50°) as follows in Table 6.

TABLE 6

| Example | Everyday Surface | Cycle 3 | Cycle 6 | Cycle 9 | Cycle 12 | Cycle 15 |
|---|---|---|---|---|---|---|
| 49 | Granite Counters and Tiles | High | High | Medium | Medium | Medium |
| 40 | Formica-type Counters | High | Medium | Medium | Low | Low |
| 51 | Glass Tables | High | High | High | High | High |
| 52 | Ceramic Counter, Wall and Floor Tiles | High | High | High | High | High |
| 53 | Polished Marble Tables and Counters | High | High | Medium | Medium | Low |
| 54 | Exterior Windows and Patio Doors | High | High | High | High | High |
| 55 | Interior Windows, Mirrors and Patio Doors | High | High | High | High | High |
| 56 | Porcelain Sinks and Bathtubs | High | High | High | High | High |
| 57 | Sink, Bathtub and Shower Plumbing Fixtures | High | High | High | Medium | Medium |
| 58 | Acrylic, Fiberglass and Cultured Marble Sinks, Tubs and Surrounds | High | High | Medium | Medium | Low |
| 59 | Vehicular Windshields, Windows, Mirrors and Lights (Exterior) | High | High | High | High | High |
| 60 | Vehicular Windshields, Windows, Mirrors and Lights (Interior) | High | High | High | High | High |

TABLE 6-continued

| Example | Everyday Surface | Cycle 3 | Cycle 6 | Cycle 9 | Cycle 12 | Cycle 15 |
|---|---|---|---|---|---|---|
| 61 | Vehicular Exteriors - Pain Finishes, Plastic and Metal Components | High | High | Medium | Medium | Medium |

EXAMPLE 62

The Preparation and Testing of a Concentrated Cleaning and Multifunctional Coating Composition 55 gms of deionized water was weighed into a 250 ml beaker employing a magnetic stirring bar for mixing. 18 gms of isopropanol were added and mixed. The solution was adjusted to pH=3 with 1 N. hydrochloric acid. 4.2 gms of a 72% solution of 3-(trimethoxysilyl)propyldimethyloctadecyl ammonium chloride solution in alcohol (Dow Corning 9-6346) were added with stirring followed by 22.9 gms of 35% hydrogen peroxide. The final composition contained 3.0% 3-(trimethoxysilyl)propyldimethyloctadecyl ammonium chloride and 8.0% hydrogen peroxide and had a pH of 3.

The composition was applied to a glass surface and the Bonding Test completed according to the defined protocol. The result after the MIRACLE SCRUB was "Excellent". Prior to scrubbing with MIRACLE SCRUB, the surface also showed an "Excellent" drop repellency result.

EXAMPLE 63

Antimicrobial Efficacy of Cationic Organosilane Quaternary Ammonium Compound/Hydrogen Peroxide Composition on Tile Surfaces These tests determine the antimicrobial efficacy of the compositions of this invention on everyday surfaces contaminated with a mixture of microbiological organisms consisting of Escherichia coli, Staphylococcus aureus and Bacillus subtilis. The composition tested was Example 1 (Table 1) consisting of 3-(trimethoxysilyl)propyldimethyloctadecyl ammonium chloride with hydrogen peroxide. The following Materials and Methods were employed to conduct the tests.

Materials
1. Microorganisms:
   a. Escherichia coli (ATCC 11229)
   b. Staphylococcus aureus (ATCC 25923)
   c. Bacillus subtilis (ATCC 6363)
2. Media:
   a. Blood agar plate (BAP); Tryptic Soy Agar amended with 5% defibrinated sheep blood
   b. Butterfield's Buffer (BFB)
3. McFarland Turbidity Standard (VWR)
4. Sterile Supplies:
   a. Sterile swabs
   b. Micropipette and sterile tips
5. Equipment:
   a. Incubator
   b. Spiral Biotech Autoplate 4000
6. Paper towels
7. Tile surfaces
8. Example 1 composition (cationic organosilane quaternary ammonium compound with hydrogen peroxide) for testing Methods 1. The Blood Agar Plates (BAP) were inoculated with fresh cultures of the test organisms to obtain confluent growth and incubated at 35° C. for 24 hours. A suspension of each organism was prepared by transferring colonies of each organism into separate 10 ml tubes of Butterfield's buffer. The suspensions were adjusted to a turbidity of 0.5 McFarland units, corresponding to approximately $1 \times 10^6$ cells.

2. A 1:100 dilution of each suspension was performed by aliquoting 0.1 ml of suspension into 10 ml BFB, creating organism suspensions.

3. To ensure no background microbial contamination was present, all test surfaces were cleaned with isopropyl alcohol and allowed to air dry.

4. Duplicate 100 $cm^2$ areas were measured and designated on the test surfaces for each organism and labeled using masking tape.

5. Test areas were sampled with BFB pre-moistened sterile swabs to confirm test areas were negative for bacterial growth.

6. Using a micropipette and sterile tips, 0.1 ml of the organism suspensions were applied independently to the corresponding sections of the test surfaces and evenly distributed using a flame sterilized glass rod to cover the entire 100 $cm^2$.

7. Each surface was then treated with the composition of Example 1 by spraying it onto the surface to be cleaned and wiping with paper towel or soft cloth until crystal clear and sparkling."

8. Test areas were sampled with BFB pre-moistened sterile swabs.

9. The organism suspensions and test sample swabs were vortexed to ensure homogeneity and cultured onto BAP via the Spiral Biotech Autoplate 4000.

10. The cultured samples were incubated at 35° C. for 48 hours. Plates were examined and organisms enumerated.

Results

The analytical data for the tile surface are shown below in Table 7.

TABLE 7

| Organism | Negative Surface Control CFU/100 $cm^2$ | Organism Inoculum (0.1 ml of Organism Suspension) CFU/ml | Treated Surfaces CFU/100 $cm^2$ |
|---|---|---|---|
| E. coli | <10 | 2.88 × $10^2$ | <10 |
| E. coli | <10 | 2.88 × $10^2$ | <10 |
| S. aureus | <10 | 3.44 × $10^2$ | <10 |
| S. aureus | <10 | 3.44 × $10^2$ | <10 |

TABLE 7-continued

| Organism | Negative Surface Control CFU/100 cm² | Organism Inoculum (0.1 ml of Organism Suspension) CFU/ml | Treated Surfaces CFU/100 cm² |
|---|---|---|---|
| B. subtilis | <10 | 7.27 × 10² | <10 |
| B. subtilis | <10 | 7.27 × 10² | <10 |

The negative control data demonstrates that all surfaces were free of bacteria prior to the experiment. The results indicate that the composition is an effective bactericide against *Bacillus subtilis, Staphylococcus aureus*, and *Escherichia Coli*.

Those of ordinary skill in the art realize that the descriptions, procedures, methods and compositions presented above can be revised or modified without deviating from the scope of the described embodiments, and such do not depart from the scope of the invention.

What is claimed is:

1. A cleaning and multifunctional coating composition for treating a surface comprising
   a cationic organosilane quaternary ammonium compound which is bondable onto said surface and
   hydrogen peroxide in an aqueous media, said components in effective amounts for cleaning said surface and for bonding a multifunctional coating onto said surface thereby rendering it (a) water and soil repellent and (b) antimicrobial.

2. The composition of claim 1 wherein said quaternary compound has a $C_{10}$–$C_{22}$ saturated or unsaturated hydrocarbon group.

3. The composition of claim 1 wherein said quaternary compound is present in an amount up to about 3% by weight and said hydrogen peroxide is present in an amount up to about 8% by weight.

4. The composition of claim 1 wherein said quaternary compound is present in an amount up to about 1% by weight and said hydrogen peroxide is present in an amount of about 3 to about 6% by weight.

5. The composition of claim 1 which further contains a solvent selected from the group of an alcohol, polyol, glycolether and mixtures thereof.

6. The composition of claim 5 wherein the polyol or alcohol is a glycol, propylene glycol monomethyl ether, methanol, ethanol or isopropanol.

7. The composition of claim 1 where the aqueous media is acidic.

8. The composition of claim 7 wherein the pH is on the order of about 2 to about 5.

9. The composition of claim 1 wherein the aqueous media is deionized water.

10. The composition of claim 1 wherein said quaternary compound is defined by the formula

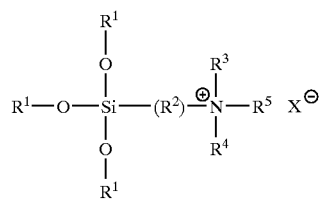

wherein $R^1$=hydrogen and/or $C_1$ to $C_4$ alkyl; $R^2$=divalent hydrocarbon radical with $C_1$ to $C_8$ carbon atoms, $R^3$=hydrogen or $C_1$ to $C_4$ alkyl, $R^4$=hydrogen or $C_1$ to $C_{10}$ alkyl, $R^5$=$C_{10}$ to $C_{22}$ saturated or unsaturated hydrocarbon radical and X=halide, carboxylate, sulfonate, hydroxide, sulfate, or phosphate.

11. A cleaning and multifunctional coating composition for treating a surface comprising
   a cationic organosilane quaternary ammonium compound which is bondable onto said surface in an amount up to about 3% by weight defined by the formula:

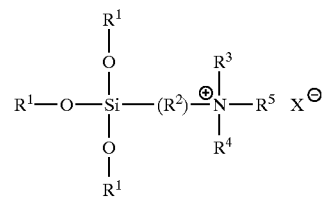

wherein $R^1$=hydrogen and/or $C_1$ to $C_4$ alkyl; $R^2$=divalent hydrocarbon radical with $C_1$ to $C_8$ carbon atoms, $R^3$=hydrogen or $C_1$ to $C_4$ alkyl, $R^4$=hydrogen or $C_1$ to $C_{10}$ alkyl, $R^5$=$C_{10}$ to $C_{22}$ saturated or unsaturated hydrocarbon radical and X=halide, carboxylate, sulfonate, hydroxide, sulfate, or phosphate and
   hydrogen peroxide in an amount up to about 8% by weight in an acidic deionized aqueous media, said components in effective amounts for cleaning said surface and for bonding a multifunctional coating onto said surface thereby rendering it (a) water and soil repellent and (b) antimicrobial.

12. The composition of claim 11 wherein the pH of the acidic media is about 2 to about 5.

13. The composition of claim 11 which further contains a solvent selected from the group of an alcohol, polyol, glycolether and mixtures thereof.

14. The composition of claim 11 which further contains an alcohol selected from the group consisting of methanol, ethanol, and isopropanol.

15. The composition of claim 11 wherein said organosilane quaternary ammonium compound is selected from the group consisting of 3-(trimethoxysilyl)propyldimethyloctadecyl ammonium chloride, 3-(trimethoxysilyl)propyldidecylmethyl ammonium chloride, 3-(trimethoxysilyl)propyltetradecyldimethyl ammonium chloride, 3-(trimethoxylsilyl)propyldimethylsoya ammonium chloride, 3-(trimethoxysilyl)propyldimethyloleyl ammonium chloride, 3-(trimethoxysilyl)propyloctadecyl ammonium chloride, 3-(trimethoxysilyl)propyloleyl ammonium chloride, and 3-(trihydroxysilyl)propyldimethyloctadecyl ammonium chloride.

16. The composition of claim 11 wherein the organosilane quaternary ammonium compound is 3(trimethyoxysilyl) dimethyloctadecyl ammonium chloride in an amount of from about 0.4 to about 0.7% by weight and the hydrogen peroxide is in an amount of about 3% by weight.

17. A method for cleaning a surface and providing it with a multifunctional coating comprising
   applying to the surface a composition comprising a cationic organosilane quaternary ammonium compound which is bondable onto said surface and hydrogen peroxide in an aqueous media,
   forming a clean, soil and water-repellent and antimicrobial coating bonded onto said surface.

18. The method of claim 17 wherein the composition is applied as a liquid to a soiled surface,
removing the soil from the surface and forming a clean, water and soil repellent and antimicrobial coating bonded onto said surface.

19. The method of claim 18 wherein said soil is wiped off of said surface thereby forming said clean, water and soil repellent and antimicrobial coating bonded onto said surface.

20. The method of claim 17 wherein said composition comprises
a cationic organosilane quaternary ammonium compound which is bondable onto said surface in an amount up to about 3% by weight defined by the formula:

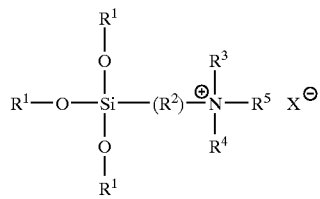

wherein $R^1$=hydrogen and/or $C_1$ to $C_4$ alkyl; $R^2$=divalent hydrocarbon radical with $C_1$ to $C_8$ carbon atoms, $R^3$=hydrogen or $C_1$ to $C_4$ alkyl, $R^4$=hydrogen or $C_1$ to $C_{10}$ alkyl, $R^5$=$C_{10}$ to $C_{22}$ saturated or unsaturated hydrocarbon radical and X=halide, carboxylate, sulfonate, hydroxide, sulfate, or phosphate and
hydrogen peroxide in an amount up to about 8% by weight in an acidic deionized aqueous media, said components in effective amounts for cleaning said surface and for bonding a multifunctional coating onto said surface thereby rendering it (a) water and soil repellent and (b) antimicrobial.

21. The method of claim 20 wherein the acidic media has a pH of about 2 to about 5.

22. The method of claim 20 which further contains an alcohol selected from the group consisting of methanol, ethanol, and isopropanol.

23. The method of claim 22 wherein said organosilane quaternary ammonium compound is selected from the group consisting of 3-(trimethoxysilyl)propyldimethyloctadecyl ammonium chloride, 3-(trimethoxysilyl)propyldidecylmethyl ammonium chloride, 3-(trimethoxysilyl)propyltetradecyldimethyl ammonium chloride, 3-(trimethoxylsilyl)propyldimethylsoya ammonium chloride, 3-(trimethoxysilyl)propyldimethyloleyl ammonium chloride, 3-(trimethoxysilyl)propyloctadecyl ammonium chloride, 3-(trimethoxysilyl)propyloleyl ammonium chloride, and 3-(trihydroxysilyl)propyldimethyloctadecyl ammonium chloride.

24. The method of claim 17 wherein the organosilane quaternary ammonium compound is 3(trimethyoxysilyl)dimethyloctadecyl ammonium chloride in an amount of from about 0.4 to about 0.7% by weight and the hydrogen peroxide is in an amount of about 3% by weight.

25. The method of claim 17 wherein the surface is selected from the group consisting of metal, glass, plastics, rubber, porcelain, ceramic, marble, granite, cement, tile, sand, silica, enameled appliances, polyurethane, polyester, polyacrylic, melamine/phenolic resins, polycarbonate, siliceous, painted surfaces and wood.

* * * * *